United States Patent [19]

Gupta

[11] Patent Number: 4,506,152

[45] Date of Patent: Mar. 19, 1985

[54] ILLUMINATION SYSTEM

[75] Inventor: Bal K. Gupta, Waterloo, Canada

[73] Assignee: NCR Canada Ltd. - NCR Canada LTEE, Mississauga, Canada

[21] Appl. No.: 397,335

[22] Filed: Jul. 12, 1982

[51] Int. Cl.$^3$ ............................................. H01J 3/14
[52] U.S. Cl. ................................ 250/216; 350/625
[58] Field of Search ............... 250/216; 350/293, 296, 350/299; 362/237, 241, 297, 298, 301, 346, 347, 361

[56] References Cited

U.S. PATENT DOCUMENTS

| | | | |
|---|---|---|---|
| Re. 29,017 | 10/1976 | Hildenbrandt | 240/41.35 R |
| 293,311 | 3/1881 | Brush | 362/347 |
| 1,595,173 | 8/1926 | Stiert | 362/346 |
| 1,913,517 | 6/1933 | Smith et al. | |
| 1,913,519 | 6/1933 | Smith et al. | |
| 2,878,369 | 3/1959 | Rijnders | 240/25 |
| 2,953,964 | 9/1960 | Dresser | 350/293 |
| 3,469,837 | 9/1969 | Heilig | 350/299 |
| 3,529,148 | 9/1970 | Stefano et al. | 240/41.35 |
| 3,745,325 | 7/1973 | Harvey | 350/299 |
| 3,982,116 | 9/1976 | Sakuma | 240/1.3 |
| 4,201,910 | 5/1980 | Copeland et al. | 250/216 |
| 4,225,923 | 9/1980 | Bloemendaal et al. | 362/301 |
| 4,241,392 | 12/1980 | Boone | 362/342 |
| 4,259,709 | 3/1981 | Eddings | 362/237 |
| 4,401,887 | 8/1983 | Finley et al. | 250/216 |

FOREIGN PATENT DOCUMENTS 336779 10/1930 United Kingdom ............... 362/298

OTHER PUBLICATIONS

*International Projectionist*, vol. 25, 12/1950, pp. 24–25, A Comparison of the Ventarc Mirror with the Elliptical Mirror.

Primary Examiner—David C. Nelms
Assistant Examiner—James Gatto
Attorney, Agent, or Firm—Albert L. Sessler, Jr.

[57] ABSTRACT

A system is provided for the sensing of documents, which system includes an arrangement of reflective elements capable of directing illumination onto the object to be sensed in such a manner that the flux density of the illumination is greater adjacent to the boundaries of said object than in the middle portion thereof. This compensates for the vignetting effect found in lenses. A source of illumination is positioned on a first focal line of a cylindrical elliptical mirror, with the object to be illuminated being positioned at the second focal line. First additional mirrors forming end pieces for the elliptical mirror, and second additional mirrors located adjacent to the boundaries of the object to be sensed, cooperate to direct light from the source to the object in such a way as to achieve the desired distribution of illumination across the object. Several different embodiments of the cylindrical elliptical mirror are disclosed.

21 Claims, 18 Drawing Figures

ILLUMINATION SYSTEM

BACKGROUND OF THE INVENTION

This invention relates generally to illumination systems and more particularly to illumination systems employed in document sensing systems.

Machine sensing of documents is an essential part of the total automation of data processing systems for handling various types of documents, such as, for example, checks in a financial environment. Such automation has become increasingly important to the smooth functioning of commerce in today's world, due to the tremendous numbers of documents which circulate daily. Accurate high-speed processing of documents requires that light reflected from a suitably illuminated document be monitored with a sensing device to ascertain the data content of the document.

SUMMARY OF THE INVENTION

The present invention provides a system for illuminating an object by providing a higher intensity of illumination adjacent the opposite boundaries of the area to be illuminated, so as to counteract the effects of lens vignetting, which, for a uniformly illuminated object, result in a lower intensity of illumination in areas adjacent to the periphery of the image formed by the lens as compared to that in the central part of the image.

In accordance with one embodiment of the invention, an illumination system for illuminating an object comprises an elliptical cylindrical mirror; an illumination source positioned on a first focal line of the mirror and focused to provide illumination of said object along the second focal line of the mirror; first and second mirror means positioned in first and second parallel planes, respectively, which are located adjacent to opposite boundaries of the object to be illuminated; and third and fourth mirror means, which are positioned to constitute end elements of the cylindrical surface defining said elliptical cylindrical mirror; whereby illumination from said illumination source is reflected from said cylindrical mirror and said first, second, third and fourth mirror means to increase the relative illumination adjacent to the boundaries to the object to be illuminated.

In accordance with another embodiment of the invention, a document sensing system comprises a track along which a document may be moved for sensing information therefrom, said track including walls for restraining undesired movement of the document and also including a slit in one of said walls through which the document may be sensed; an elliptical mirror means positioned to direct illumination through said slit to enable reading of information from said document as it is moved past said slit; an illumination source positioned on a first focal line of the mirror and focused by said elliptical mirror means to provide illumination of said document through said slit at a position substantially coincident with the second focal line of the mirror; second and third mirror means positioned in first and second planes, respectively, which are adjacent to boundaries of the document to be illuminated; fourth and fifth mirror means which constitute end elements of said elliptical mirror means; and illumination sensing means for receiving illumination generated by said illumination source and reflected from said object through said slit; whereby the second, third, fourth and fifth mirror means function to increase the relative illumination adjacent to the boundaries of said object.

It is accordingly an object of the present invention to provide a novel and efficient illumination system for illuminating an object.

Another object is to provide a novel and efficient document sensing system.

Another object is to provide an illuminating system having the ability to provide a distribution of illumination over an object to be sensed which compensates for the vignetting effect of a lens.

A further object is to provide an illuminating system comprising an elliptical cylindrical mirror and a plurality of other mirrors in combination therewith which cooperate to increase the relative illumination adjacent to the boundaries of an object to be illuminated.

With these and other objects, which will become apparent from the following description, in view, the invention includes certain novel features of construction and combinations of parts, a plurality of forms or embodiments of which are hereinafter described with reference to the drawings which accompany and form a part of this specification.

DESCRIPTION OF THE PREFERRED EMBODIMENTS

Figure 1:
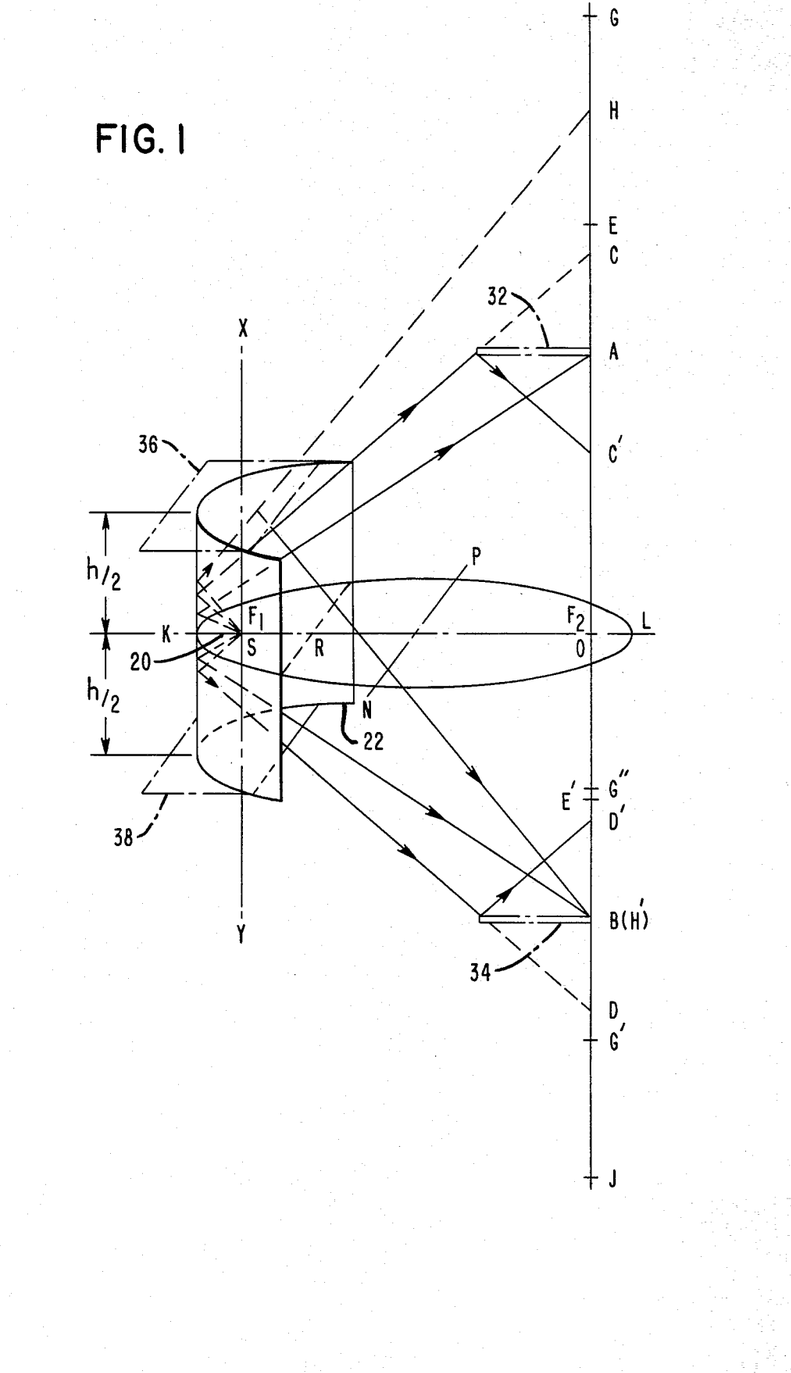
FIG. 1 is a schematic diagram of an illumination system embodying the present invention.

Referring now to FIG. 1, the schematic diagram therein shows an illustrative organization of various elements of the present invention.

Figure 2:
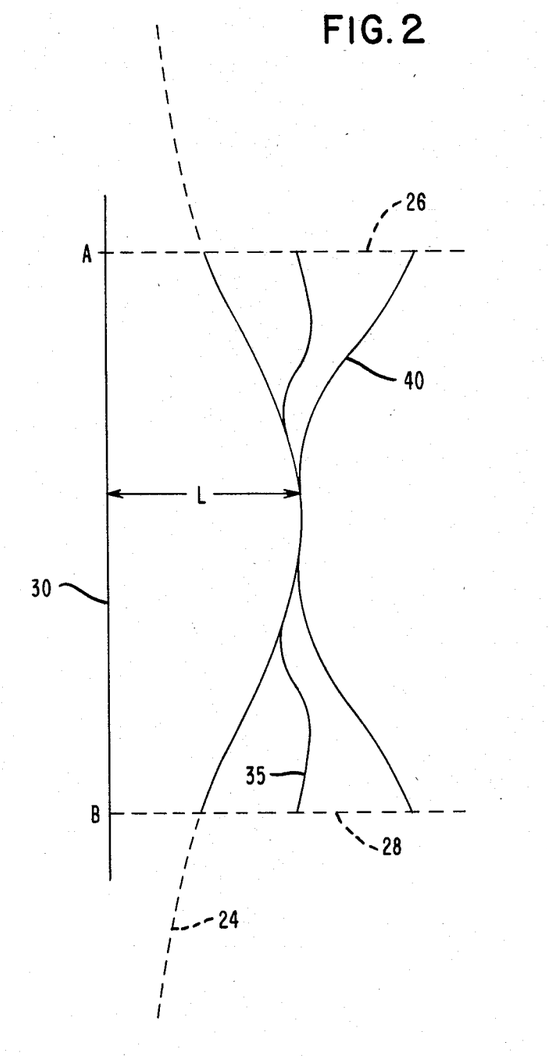
FIG. 2 is a diagrammatic view illustrating the flux density of illumination produced across a planar object by each of three different reflector arrangements.

Light from a source of illumination 20 situated on a first focal line XY of an elliptical cylindrical mirror 22 is focused along the seocnd focal line GJ of the mirror 22. The illumination along line GJ produced by the mirror 22, without the use of any additional reflective elements, is shown in FIG. 2 as curve 24. The dashed lines 26 and 28 in FIG. 2, corresponding to locations A and B on the second focal line GJ of FIG. 1, represent the boundaries of a line or area to be illuminated, and the line 30 represents a base line of zero illumination. In FIG. 1, KL equals 2a and is the major axis of the ellipse which defines the surface of the mirror 22, while NP equals 2b and is the minor axis; KR equals d and is the mirror depth; and h is the mirror height. The total mirror height is divided into two halves, each designated h/2, each of which extends from the major axis of the ellipse as shown in FIG. 1 to the upper and lower boundaries of the mirror.

It will be seen that flux density under curve 24 is at a maximum L at a point directly opposite the source of illumination 20, and decreases as the boundaries 26 and 28 are reached and passed. These boundaries, which are coincident with points A and B, are shown at the points of 50 percent illumination on the curve 24, compared to the maximum illumination L at the point directly opposite the source of illumination 20.

The uniformity of illumination across the line to be illuminated is improved by the placement of two mirrors 32 and 34 adjacent to points A and B respectively. The result is an almost uniform illumination of the line, as shown by the curve 35 of FIG. 2. It will be seen that these mirrors 32 and 34 reflect light which would otherwise impinge on the second focal line GJ at locations outside points A and B, so that this light now falls on the second focal line between points A and B. For example, the ray which would normally fall on point C now falls on point C', and the ray which would normally fall on point D not falls on point D'.

However, an extended object, such as one positioned between points A and B, must have increasingly higher illumination toward its edges if its image formed by a vignetting lens is required to have substantially uniform illumination. This can be achieved by placing two more plane mirrors 36 and 38 at the ends of the elliptical cylindrical mirror, at distances h/2 from the line through the source S, as shown in FIG. 1. Light which would reach location EHG on the line JG is diverted to location E'H'G' by the mirror 36, and then to location H'E'G" by the mirror 34. Hence, the illumination at point B is enhanced by an amount twice that which would impinge on point H, if the device did not have any of the mirrors 32, 34, 36 and 38. Similar results, utilizing the mirrors 38 and 32, are not shown specifically on the drawing of FIG. 1, in order to avoid confusion in the drawing by excessive rays appearing thereon. It will thus be noted that the object located between points A and B on line GJ will have higher illumination along the boundaries 26 and 28 than in the center at L. This is shown by the curve 40 of FIG. 2. Sizes and positions of the mirrors 32, 34, 36 and 38 can be adjusted in order to provide the degree of compensation of flux density along the line AB which is required for particular applications, depending upon such variables as lens type, etc.

Less than 10% variation in illumination of an image of a white surface located between points A and B, formed by a lens has been achieved using an aluminum coated metal elliptical mirror, with the following parameters:

Lens vignetting=40%,
Distance AB=120 millimeters,
Image Size=9.5 millimeters,
h=50 millimeters,
a=45 millimeters,
b=25 millimeters,
d=25.5 millimeters.

For any further necessary adjustment of the relative degree of illumination at various points along the curve 40, it is possible to replace the mirrors 36, 38 by a suitable combination and configuration of mirror strips, as will subsequently be described. A longer object between points such as A and B extended may be illuminated using a longer elliptical mirror 22 with two or more light sources, such as electric bulbs, placed along the first focal line XY of the mirror 22, as will also be described.

Figure 3:
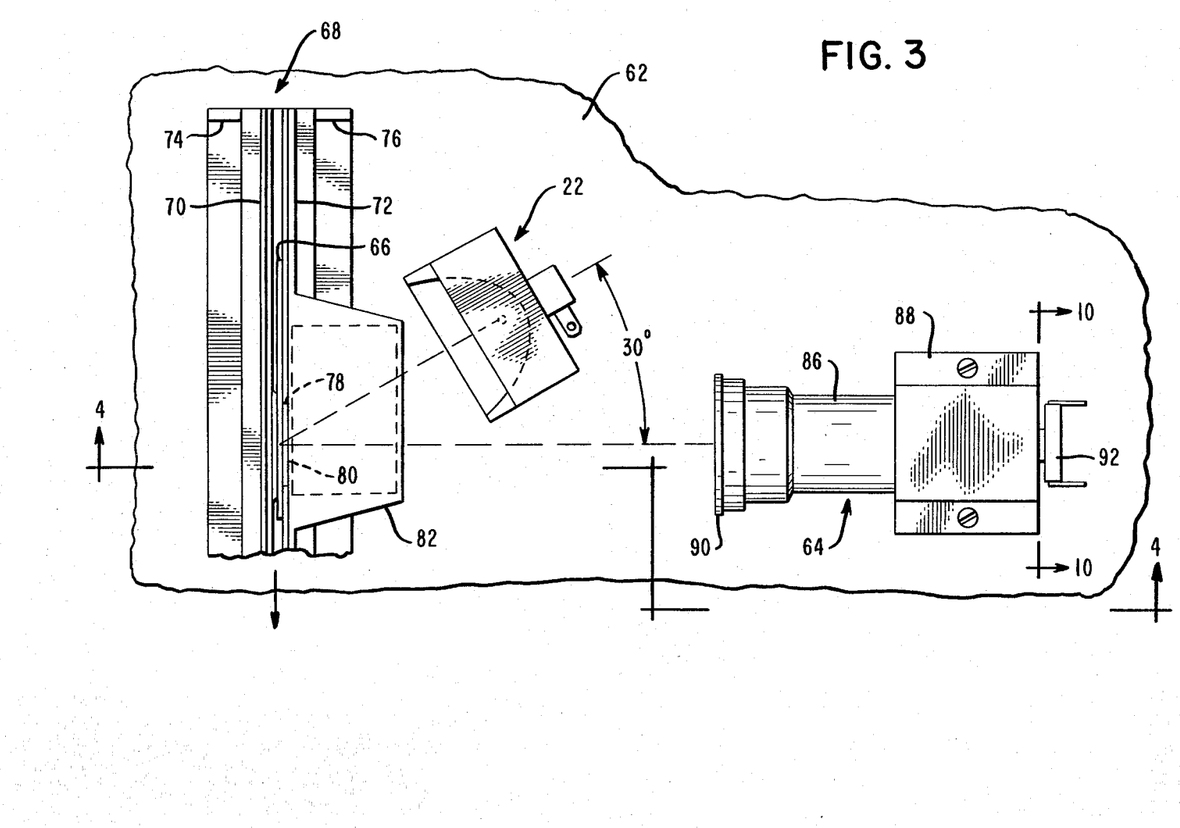
FIG. 3 is a plan view of a document sensing system embodying the present invention.
Figure 4:
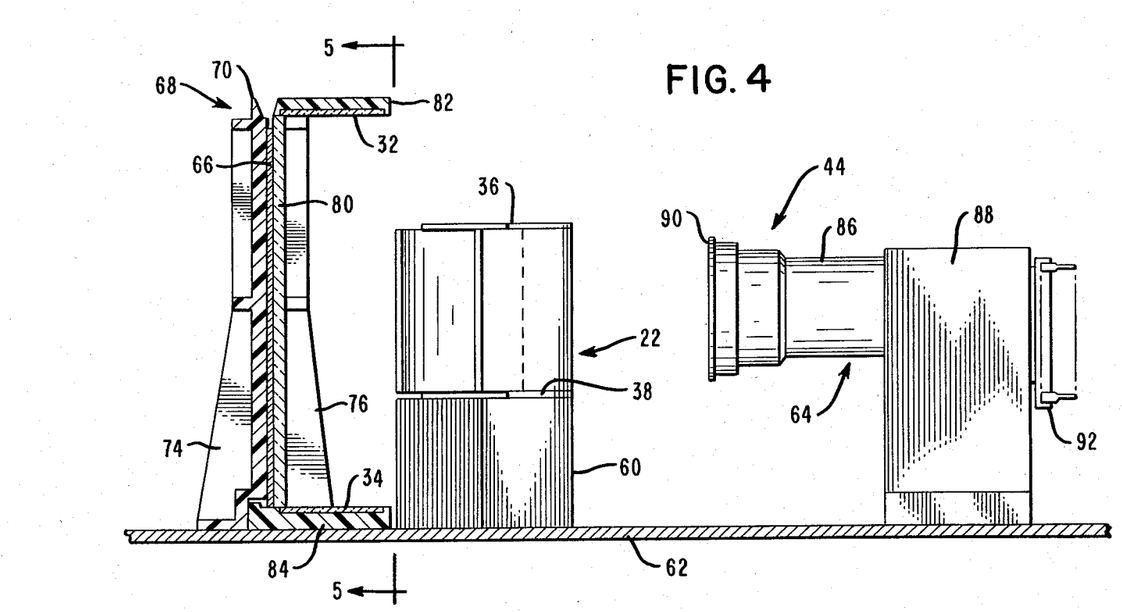
FIG. 4 is a sectional view taken along lines 4—4 of FIG. 3.
Figure 5:
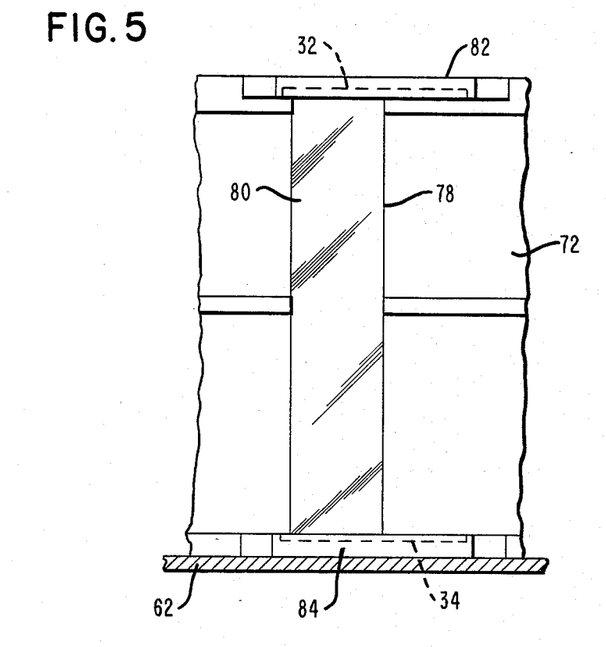
FIG. 5 is a sectional view taken along line 5—5 of FIG. 4.
Figure 7:
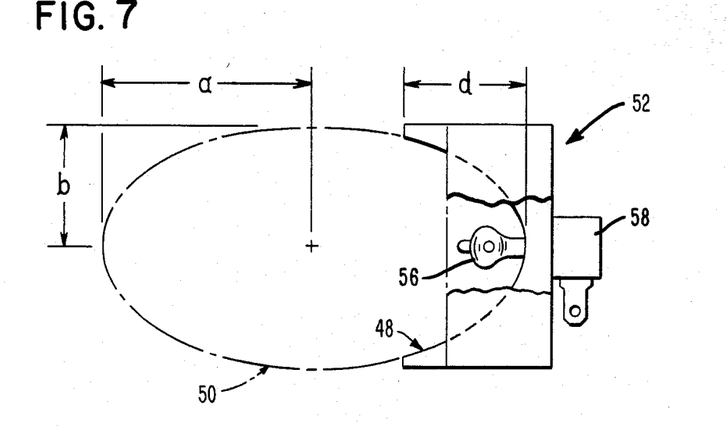
FIG. 7 is a plan view of one embodiment of the elliptical cylindrical mirror of the present invention, showing in phantom the ellipse which defines the cylindrical surface of said mirror.
Figure 8:
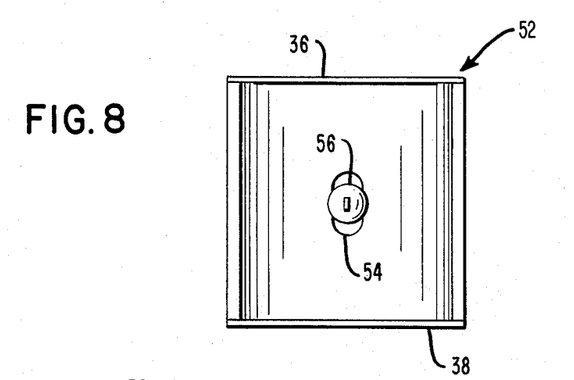
FIG. 8 is a front view of the mirror of FIG. 7.
Figure 9:
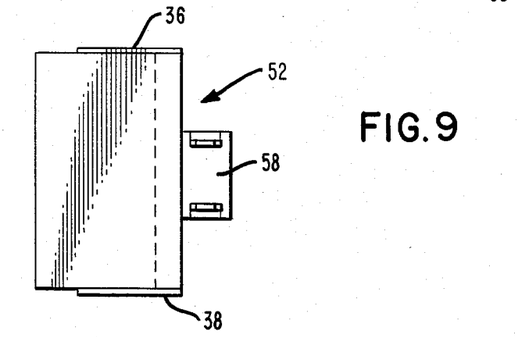
FIG. 9 is an elevation view of the mirror of FIG. 7.

In one illustrated embodiment of the present invention, the mirror 22 may take the form shown in FIGS. 7, 8 and 9. In this form, it may have the dimensions for "h", "a", "b" and "d" set forth above, and may be incorporated in a sensing apparatus 44 such as shown in FIGS. 3, 4 and 5.

In FIG. 7, the mirror surface 48 is defined by the ellipse 50, shown in dashed lines, and forms part of the external surface of a block 52. The plane mirrors 36 and 38 are placed at the upper and lower ends, respectively, of the block 52. An opening 54 in the block 52 receives a source of illumination 56 having an electrical connector 58 associated therewith to enable electrical power to be supplied to the source 56. Any suitable source 56 may be employed; one such being an M35 lamp, manufactured by Thorn Lighting, England, having a filament coil approximately 1.2 millimeters in diameter and 2.1 millimeters long. A second suitable source is an M35 lamp, manufactured by Phillips, Belgium, having a filament coil approximately 0.8 millimeters in diameter and 2.9 millimeters long.

In the sensing apparatus 44 (FIG. 4), the mirror 22 may be mounted on a support 60 secured to a base 62. As best shown in FIG. 3, the mirror 22 is mounted at an angle, for example, 30 degrees, to the axis of a sensing device 64, in order to avoid blocking the reflected light from a document 66 which is directed to the sensing device 64. Since the document 66 is of paper, cardboard or similar material, it has an irregular surface, and a substantial amount of light is reflected to the sensing device 64 because of diffusion reflection from said surface. Of course, if the document 64 had a perfect mirror surface, then the angle of reflection therefrom would be 30 degrees from the normal to the illustrated document, and the sensing device 64 would have to be positioned accordingly.

The document 66 is constrained for movement in a track 68 mounted on the base 62 which includes a first wall 70 and a second wall 72, both of which are supported by suitable strengthening members 74 and 76. The second wall 72 has a slot 78 therein, covered by a transparent element 80, so that light from the source 56, as directed by the mirror 22, may impinge on a linear portion of a document 66 passing through the track 68, and be reflected to the sensing device 64.

The track 68 also includes supports 82 and 84, to which the plane mirrors 32 and 34 are secured. It will be seen that the combination of mirrors 22, 32, 34, 36 and 38 in the apparatus of FIGS. 3, 4 and 5 is essentially the same as the corresponding combination shown in FIG. 1.

The sensing device 64 may be of any appropriate type, and may include a lens 86 mounted in a lens mount 88 secured to the base 62. The lens may be 12.8 mm f/1.4, having a 40 percent vignetting factor, and may be provided with a filter 90.

Figure 10:
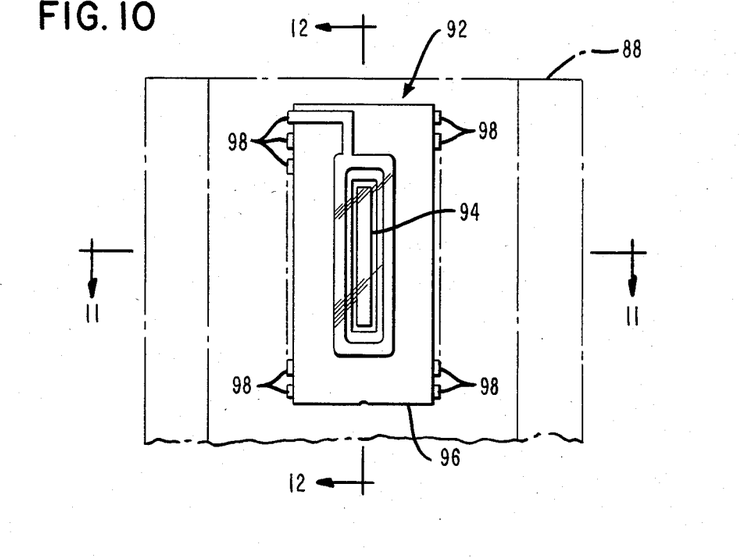
FIG. 10 is a front view of a sensing element for sensing radiation which passes through the lens of the document sensing system of the present invention.
Figures 11, 12:
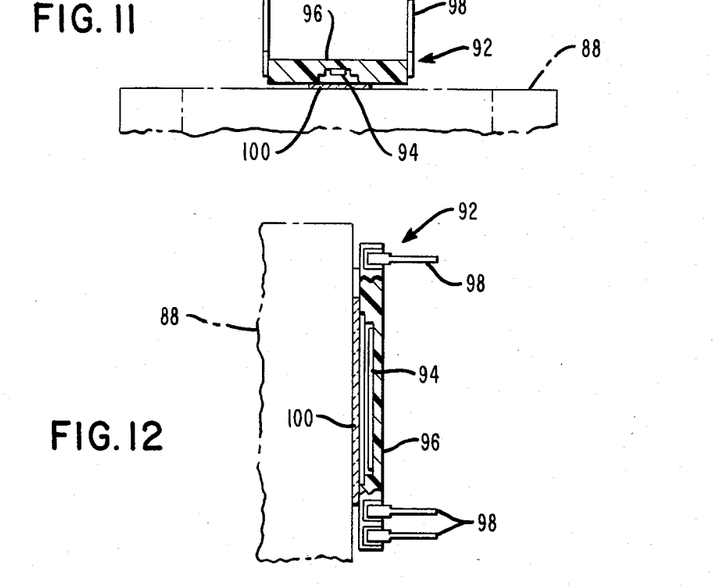
FIG. 11 is a sectional view taken along line 11—11 of FIG. 10.
FIG. 12 is a sectional view taken along line 12—12 of FIG. 10.

Secured to the rear of the lens mount 88, as shown in greater detail in FIGS. 10, 11 and 12, is a sensor 92, which may be of type CCD 133, manufactured by Fairchild, Mountainview, Calif. The sensor 92 comprises a vertical array 94 of individual sensing elements, oriented to correspond to the configuration and orientation of the slot 78 through which succeeding vertical "slices" of the document 66 are viewed as it is transported past said slot in the track 68. The array 94 is mounted on a substrate 96, and is coupled to the electronic circuitry of the system by a plurality of connectors 98. A glass window 100 is interposed between the lens mount 88 and the array 92.

Figure 6:
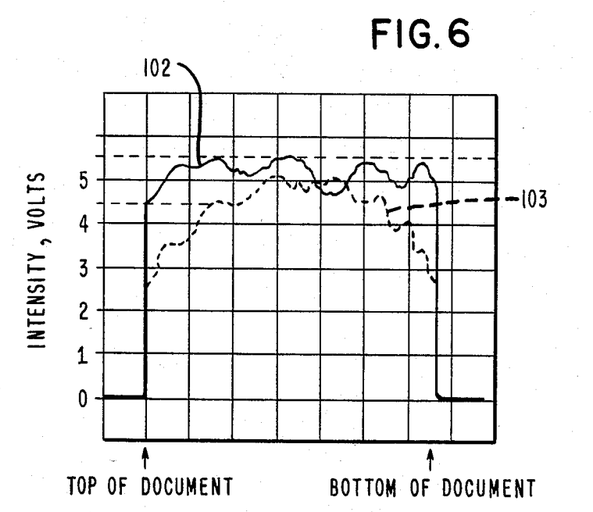
FIG. 6 is a diagrammatic view showing a comparison of light radiation received on a sensing element when the object being sensed is illuminated in accordance with the teaching of the present invention, as compared to a similar curve showing the distribution of light across a sensing element when an object is illuminated using a prior art means.

FIG. 6 provides a graphic comparison of illumination distribution across the object being scanned, using the system of the present invention, as represented by curve 102, compared to a similar distribution as obtained using a standard fiber optics illumination means as represented by curve 103. It will be noted that curve 102 maintains greater uniformity of illumination across the image of the object being illuminated than does curve 103.

Figure 13:
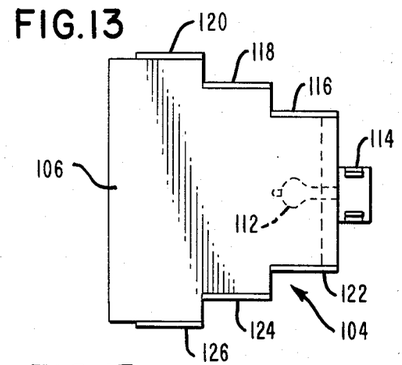
FIG. 13 is an elevation view of a second embodiment of the elliptical cylindrical mirror of the present invention.
Figure 14:
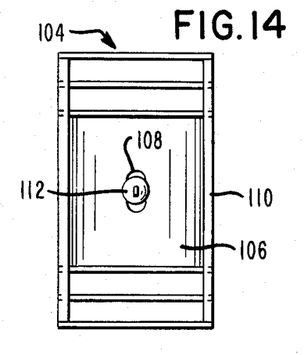
FIG. 14 is a front view of the mirror of FIG. 13.

If desired, the mirror 22 may be replaced by a mirror such as is generally designated 104 in FIGS. 13 and 14. The elliptical cylindrical surface 106 of the mirror 104 is of the same configuration as the surface 48 of the mirror 22. An opening 108 in the block 110 of the mirror 104 receives a source of illumination 112 having an electrical connector 114 associated therewith.

Instead of a single upper plane mirror 36 and a single lower plane mirror 38 being employed, in this embodiment, a plurality of upper planar mirrors 116, 118 and 120, and a corresponding plurality of lower planar mirrors 122, 124 and 126 are utilized. Variations in the size and placement of these multiple mirrors enables "fine-tuning" of illumination along the length of a particular object being scanned.

Figure 15:
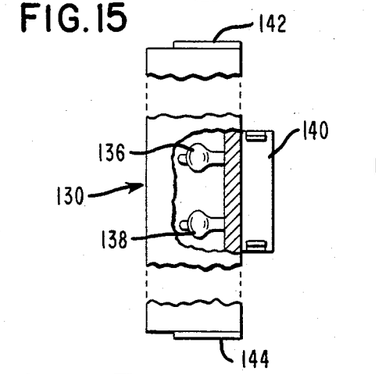
FIG. 15 is an elevation view, partly broken away, of a third embodiment of the mirror of the present invention, employing a plurality of illumination sources.
Figure 16:
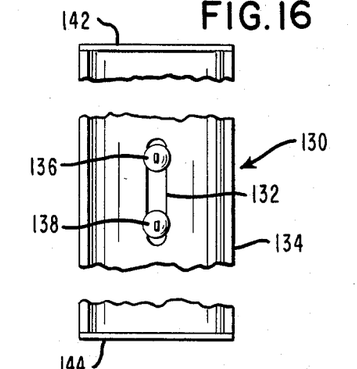
FIG. 16 is a front view, partially broken away, of the mirror of FIG. 15.

Another embodiment of a mirror which may be used in place of the mirror 22 is shown in FIGS. 15 and 16. In this embodiment, the mirror 130 is of the same general configuration as the mirror 22, but a plurality of sources of illumination are employed. An elongated opening 132 in the block 134 receives two sources of illumination 136 and 138, associated with an electrical connector 140. Upper and lower planar mirrors 142 and 144 are placed at the ends of the mirror 130. Use of the embodiment of FIGS. 15 and 16 is particularly suited for situations in which a relatively long object is to be illuminated. If the object is sufficiently long, more than two sources of illumination may be employed, and the mirror surface may be correspondingly extended in the vertical direction.

Figure 17:
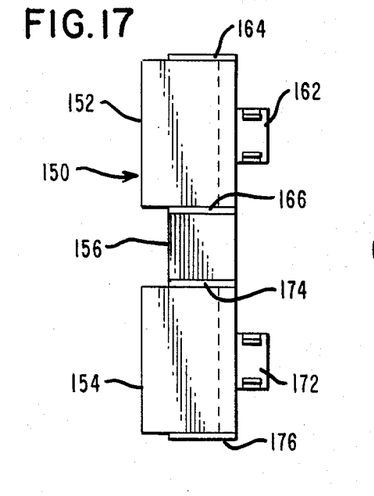
FIG. 17 is an elevation view of a fourth embodiment of the mirror of the present invention, embodying a plurality of stacked mirrors.
Figure 18:
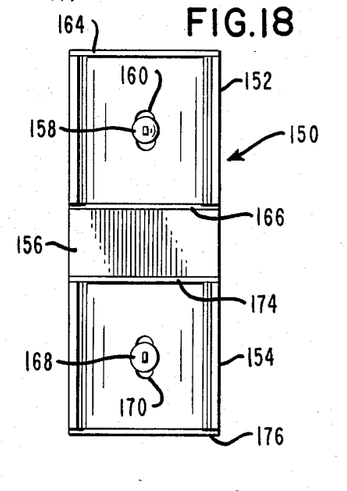
FIG. 18 is a front view of the multiple mirror arrangement of FIG. 17.

A further embodiment of a mirror which may be used in place of the mirror 22 is shown in FIGS. 17 and 18. In this embodiment, the mirror 150 essentially comprises two individual mirrors 152 and 154, each corresponding in configuration to the mirror 22. The two mirrors 152 and 154 are separated by and secured to a spacer block 156. The mirror 152 includes a source of illumination 158 received in an opening 160 and having an electrical connector 162 attached thereto. Upper and lower planar mirrors 164 and 166 define the ends of the mirror 152. The mirror 154 includes a source of illumination 168 received in an opening 170 and having an electrical connector 172 attached thereto. Upper and lower mirrors 174 and 176 define the ends of the mirror 154.

While the forms of the invention shown and described herein are admirably adapted to fulfill the object primarily stated, it is to be understood that it is not intended to confine the invention to the forms or embodiments disclosed herein, for it is susceptible of embodiment in various other forms within the scope of the appended claims.

I claim:

1. An illumination system for illuminating an object, comprising:
   an elliptical cylindrical mirror;
   an illumination source positioned on a first focal line of the mirror and focused to provide illumination of said object along the second focal line of the mirror;
   first and second mirror means positioned in first and second parallel planes, respectively, which are located adjacent to opposite boundaries of the object to be illuminated; and
   third and fourth mirror means, which are positioned to constitute end elements of the cylindrical surface defining said elliptical cylindrical mirror;
   whereby illumination from said illumination source is reflected from said cylindrical mirror and said first, second, third and fourth mirror means to increase the relative illumination adjacent to the boundaries of the object to be illuminated.

2. The illumination system of claim 1 in which the planes of said first and second mirror means are parallel to each other.

3. The illumination system of claim 1, in which each of said third and fourth mirror means is positioned in a plane.

4. The illumination system of claim 3 in which the planes of said third and fourth mirror means are parallel to each other.

5. The illumination system of claim 3 in which the planes of said first, second, third and fourth mirror means are parallel.

6. The illumination system of claim 1 in which the illumination source comprises a single element.

7. The illumination system of claim 1 in which the illumination source comprises a plurality of elements spaced along the first focal line.

8. The illumination system of claim 1 in which each of the third and fourth mirror means comprises a plurality of stepped parallel mirror surfaces.

9. An illumination system for illuminating a planar object, comprising:
   an elliptical cylindrical mirror;
   an illumination source positioned on a first focal line of the mirror and focused to provide illumination of said planar object at a position extending through the second focal line of the mirror;

first and second mirror means positioned in first and second parallel planes, respectively, which are perpendicular to said position and which are located adjacent to opposite boundaries of the planar object to be illuminated; and third and fourth mirror means positioned in third and fourth planes, respectively, which are parallel to said second and third planes, said third and fourth mirror means being positioned to intersect the cylindrical surface defining said elliptical cylindrical mirror so that the third and fourth mirror means constitute end elements thereof;

whereby illumination from said illumination source is reflected from said mirror and said first, second, third and fourth mirror means to increase the relative illumination adjacent to the boundaries of the object to be illuminated.

10. A document sensing system comprising:

a track along which a document may be moved for sensing information therefrom, said track including walls for restraining undesired movement of the document and also including a slit in one of said walls through which the document may be sensed;

an elliptical mirror means positioned to direct illumination through said slit to enable reading of information from said document as it is moved past said slit;

an illumination source positioned on a first focal line of the mirror means and focused by said elliptical mirror means to provide illumination of said document through said slit at a position substantially coincident with the second focal line of the mirror;

second and third mirror means positioned in first and second planes, respectively, which are adjacent to boundaries of the document to be illuminated;

fourth and fifth mirror means which constitute end elements of said elliptical mirror means; and illumination sensing means for receiving illumination generated by said illumination source and reflected from said object through said slit;

whereby the second, third, fourth and fifth mirror means function to increase the relative illumination adjacent to the boundaries of said object.

11. The document sensing system of claim 10 in which the illumination sensing means includes a lens, and the increase of relative illumination adjacent to the boundaries of said object compensates for the vignetting effect of the lens.

12. The document sensing system of claim 11 in which the illumination sensing means also includes a linear array of sensing elements aligned in the same orientation as the slit in the track wall for receiving illumination reflected from said object and producing signals representative of information carried on said object.

13. The document sensing system of claim 10 in which said elliptical mirror means is disposed at an angle to the path of illumination from the slit in the track wall.

14. The document sensing system of claim 13 in which said angle is approximately thirty degrees.

15. The document sensing system of claim 10 in which said illumination source is a point source.

16. The document sensing system of claim 10 in which said illumination source comprises a plurality of point sources spaced along the first focal line of the elliptical mirror means.

17. The document sensing system of claim 10 in which said elliptical mirror means comprises a plurality of elliptical mirrors aligned along their focal lines and spaced apart from each other.

18. The document sensing system of claim 10 in which each of the fourth and fifth mirror means comprises a plurality of stepped parallel mirror surfaces.

19. The document sensing system of claim 10 in which each of the fourth and fifth mirror means is positioned in a plane.

20. The document sensing system of claim 9 in which the planes of said fourth and fifth mirror means are parallel to each other.

21. The document sensing system of claim 10 in which the planes of said second and third mirror means are parallel to each other.

* * * * *